July 9, 1940. R. B. COTTRELL 2,207,288
DRAFT GEAR
Filed Dec. 30, 1937 3 Sheets-Sheet 1
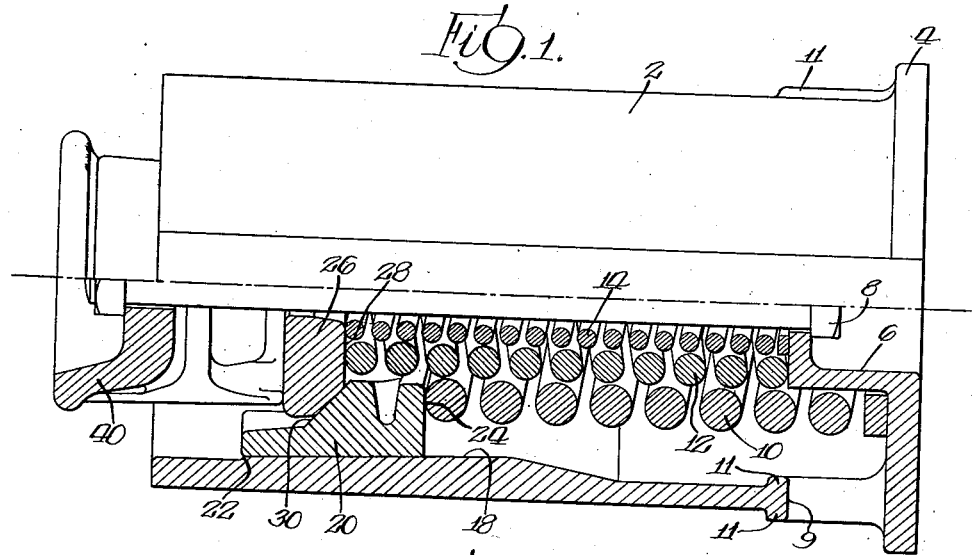
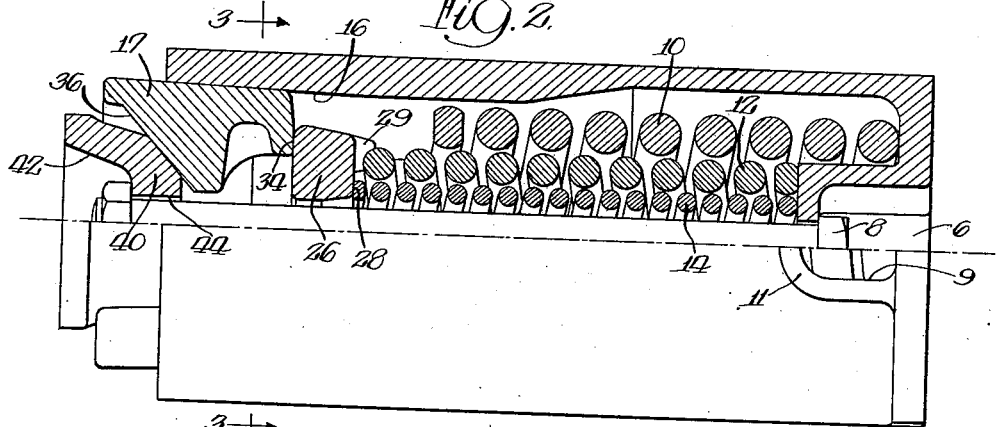
Inventor:
Robert B. Cottrell,
By Orin O. B. Garner Atty.

July 9, 1940.   R. B. COTTRELL   2,207,288
DRAFT GEAR
Filed Dec. 30, 1937   3 Sheets-Sheet 2
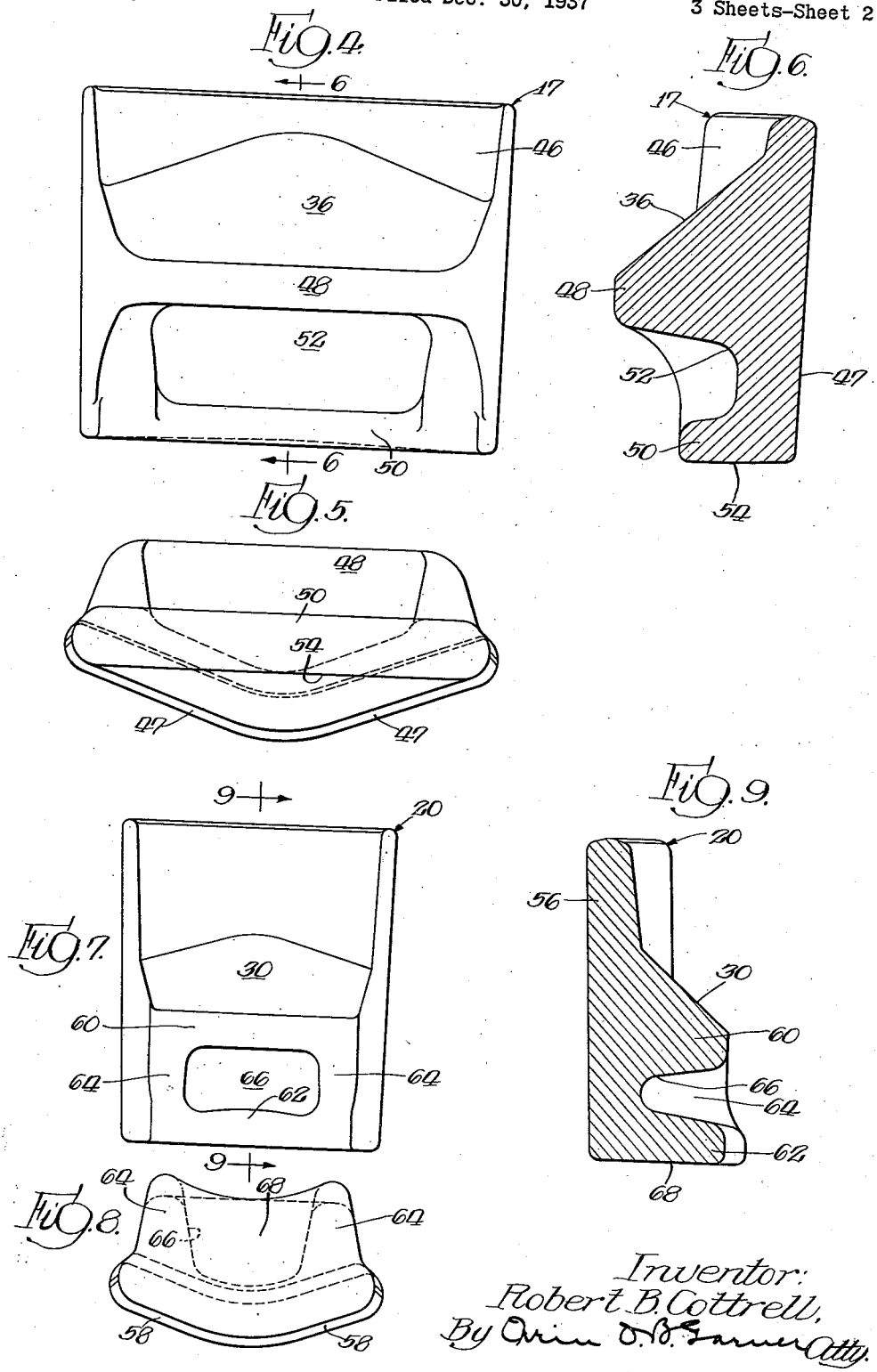

July 9, 1940.  R. B. COTTRELL  2,207,288
DRAFT GEAR
Filed Dec. 30, 1937  3 Sheets-Sheet 3
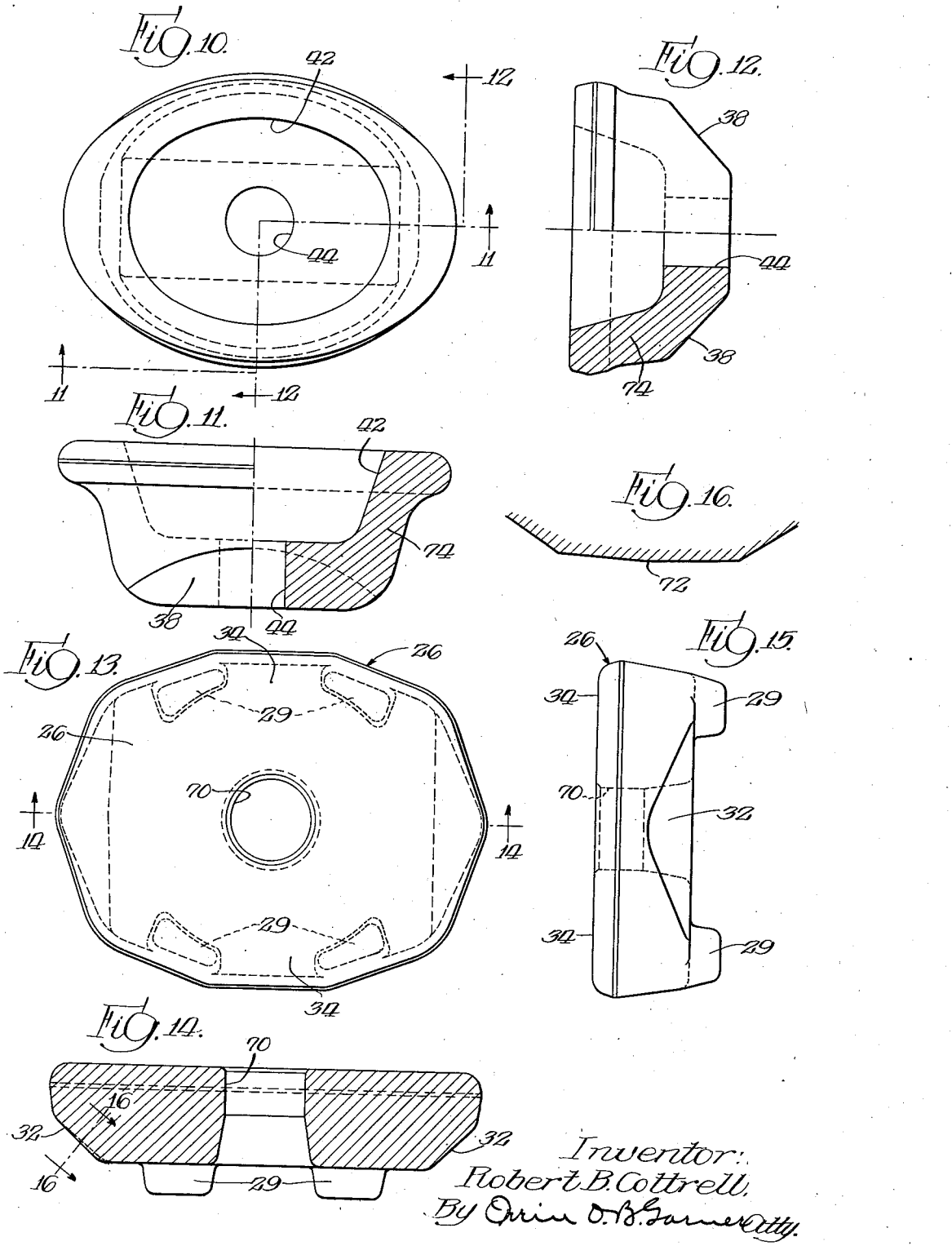
Inventor:
Robert B. Cottrell,
By Orrin O. B. Garner Atty.

Patented July 9, 1940

2,207,288

UNITED STATES PATENT OFFICE 2,207,288

DRAFT GEAR

Robert B. Cottrell, Chicago, Ill., assignor to American Steel Foundries, Chicago, Ill., a corporation of New Jersey Application December 30, 1937, Serial No. 182,559

24 Claims. (Cl. 213—32)

My invention relates to railway draft gears and more particularly to a kind of draft gear generally designated as the barrel type wherein the friction producing parts are enclosed within a housing.

It is an object of my invention to devise an improved form of draft gear wherein a plurality of sets of shoes are arranged in series, the generic form of such a gear having been more particularly described in my co-pending application bearing Serial No. 172,925, filed in the United States Patent Office on November 5, 1937.

It is a more specific object of my present invention to devise an improved form of such a series or cross-equalized gear as above described wherein the outer set of friction shoes is seated on top of the wedge block and wherein the inner set of shoes is seated on top of the main spring.

A still further object of my invention is to design such a draft gear wherein the friction shoes will be relatively free of friction tending to prevent their close engagement with the frictional surfaces of the housing throughout the movements of impact and release.

My invention contemplates a series cross-equalized type of gear wherein the shoes and their cooperating parts are so arranged that the forces of impact and of release will be applied to the shoes in such manner as to produce a maximum practicable resultant of forces urging the shoes into engagement with the surrounding housing.

My invention also comprehends a type of gear which does not require the close manufacturing tolerances necessary in a gear in which one actuating or wedging means contacts more than two shoes; moreover, a type of gear such that the various wedging angles and friction surfaces may vary with ordinary commercial tolerances practiced in the arts of steel forging and steel casting without materially affecting the operation thereof.

A pertinent object of my invention is a draft gear having parts manufactured with the usual commercial tolerances which, nevertheless, will not require a preliminary or working-in process and wherein it will not be necessary to close the gear a number of times in order for it to meet the requirements of the A. A. R. specification.

My invention also contemplates a barrel-type gear which, while meeting the A. A. R. test requirements, particularly as to capacity, will not require the highly stressed heavy and expensive springs or resilient means usually needed.

Other objects and features will become apparent from a consideration of the following description of the associated drawings as well as the appended claims.

Figure 1 is a plan view of one modification of draft gear embodying my invention, one-half of the view being in section, the section being taken in the plane bisecting the gear horizontally and substantially as indicated by the line 1—1 of Figure 3;

Figure 2 is a side elevation of the gear structure shown in Figure 1, the view being half in section and the section being taken in the vertical plane bisecting the gear longitudinally and substantially as indicated by the line 2—2 of Figure 3;

Figure 3 is a transverse sectional view through the gear structure shown in Figures 1 and 2, the section being taken substantially in the plane indicated by the line 3—3 of Figure 2;

Figure 4 is an elevational view of the inner face of one of the outer friction shoes;

Figure 5 is a bottom plan view thereof and Figure 6 is a sectional view in a plane bisecting the shoe longitudinally and substantially as indicated by the line 6—6 of Figure 4;

Figure 7 is a view in elevation of the inner face of the inner friction shoe;

Figure 8 is a bottom plan view thereof and Figure 9 is a sectional view, the section being taken in the plane bisecting the shoe longitudinally and substantially as indicated by the line 9—9 of Figure 7;

Figure 10 is a top plan view of the follower wedge;

Figure 11 is a side elevation thereof, one-half in section, the section being taken in the plane bisecting the wedge on its long diameter and substantially as indicated by the line 11—11 of Figure 10;

Figure 12 is an end elevation of the follower wedge, one-half in section, the section being taken in the plane bisecting the wedge along the short diameter thereof and substantially as indicated by the line 12—12 of Figure 10;

Figure 13 is a top plan view of the wedge block;

Figure 14 is a sectional view therethrough, the section being taken on the long diameter bisecting the wedge block and substantially as indicated by the line 14—14 of Figure 13;

Figure 15 is an end elevation of the wedge block; and

Figure 16 is a sectional view through one of the shoe engaging surfaces of the wedge block, the section being taken substantially in the plane as indicated by the line 16—16 of Figure 14;

Describing my novel gear in more detail and referring particularly to Figures 1 to 3, the housing 2 is an integral structure of somewhat novel form comprising the base 4 with the centrally formed cavity 6 of generally rectangular shape for the reception of the head of the retaining bolt 8, the walls of said cavity forming a boss projecting inwardly of said housing and forming positioning means for the large outer spring 10 and seating means for the intermediate spring 12 and the inner spring 14. Openings 9, 9 in the walls of the housing adjacent the base thereof facilitate drainage and are beaded as indicated at 11, 11. Extending inwardly from the open end thereof for about one-half the length of the housing are the V-shaped friction surfaces indicated at 16, 16 for the outer pair of shoes 17, 17 and at 18, 18 for the inner pair of friction shoes 20, 20. It may be noted that the friction surfaces for the inner friction shoes terminate inwardly of the open end of the housing as indicated at 22 (Figure 1).

The general configuration of these V-shaped friction surfaces and of the shoes which are fitted therein is best understood from a consideration of the sectional view shown in Figure 3 wherein it may be observed that the outer shoes 17, 17 have a considerably greater area of engagement against the opposed frictional faces of the housing 2 than do the inner shoes 20, 20. Such an arrangement facilitates equalization of unit pressure between the housing and respective sets of shoes as more fully explained in my above referred to co-pending application, Serial No. 172,925.

I have referred to my gear as including sets of shoes arranged in series in order to compound the forces of frictional absorption. For the present purposes, it may be noted that such a mechanism enables the device to absorb a greater force than the capacity of the associated compression spring. If a single set of shoes is associated with the spring, the multiplying factor depends upon the various angles of the friction surfaces. Where a second set of shoes is introduced in series with the first as in my present arrangement, the second set multiplies the resistance of the first set instead of simply multiplying the resistance of the spring capacity. Such mechanisms have sometimes been described as multiple action clutches. Such a multiple action clutch affords considerably more shock absorption for given spring capacity than can be obtained otherwise or an equivalent amount of shock absorption can be obtained with a lesser spring capacity. When two sets of shoes are used in series as herein set forth with one set multiplying the forces set up through the other set, the second set normally will develop greater pressure per unit area against the walls of the enclosing housing. If the area of the second set of shoes is increased as compared with the area of the first set, it will then be possible to equalize the pressure per unit area, and this I have done in the present modification.

The outer end of the large coil spring 10 abuts the base of the inner friction shoe 20 as best seen at 24 (Figure 1) and the outer ends of the intermediate spring 12 and inner spring 14 abut the wedge block 26 as indicated at 28. Positioning means 29, 29 projecting inwardly from the wedge block 26 retain the coil springs 12 and 14 in proper relationship with the wedge block. Each shoe 20 has the diagonally arranged wedge face 30 in abutment with the opposed diagonal face 32 at one end of the wedge block 26. The bases of the outer shoe 17 are seated on the lateral edges of the wedge block 26 as at 34 (Figure 2) and the overlapping arrangement of the shoes in abutment with the wedge block 26 on opposite sides thereof may be readily understood from a consideration of the sectional view of Figure 3.

It may be noted that the point of support of the inner shoe 20 on the coil spring 10 is radially inward of the center of mass of the shoe 20 so that the shoe may freely seat against the frictional surface of the housing in the movements of impact and release. The base of the outer shoe 17 is similarly seated on the wedge block 26 so that its center of mass is outward of the point of support.

The outer shoe 17 has the diagonally arranged wedging face 36 against which is seated the diagonally arranged face 38 of the follower wedge 40 of generally oval cup-like shape having the cavity 42 on its outer face and the central opening 44 for the reception of the retaining bolt 8 and the associated securing nut.

The general configuration of the inner shoes 20, 20 and the outer shoes 17, 17 is somewhat similar to the corresponding inner and outer shoes in my before-mentioned application Serial No. 172,925 with certain modifications of detail as will be apparent from the description which follows. The outer shoe 17 is shown in detail in Figures 4, 5 and 6 wherein it may be observed that the shoe has the V-shaped outer wall 46 presenting the friction surfaces 47, 47 for abutment against the previously described V-shaped friction surfaces of complementary form on the housing. The central shelf-like body portion 48 presents the diagonally arranged wedge face 36 for engagement with the follower wedge as previously described. The base flange 50 at the inner end of the shoe together with the wall 46 and the shelf portion 48 define a shallow cavity 52 on the radially inner face and at the inner end thereof. The base of the shoe as formed by the flange 50 and inner edge of the wall 46 is formed in two planes converging centrally thereof as shown at 54 (Figure 6), thus determining the position at which the shoe seats on the wedge block 26 as previously indicated at 34.

The inner shoe is shown in detail in Figures 7, 8 and 9. It is generally similar to that of the outer shoe but smaller and comprises the V-shaped wall 56 presenting the friction faces 58, 58 for abutment against complementary faces on the housing as previously described. The central body portion 60 presents the diagonally arranged wedge face 30 on which may be seated the wedge block 26, and the said body portion together with the base flange 62 and the lateral flanges 64, 64 define the cavity 66 formed on the radially inner face of the shoe at its inner end. The base or inner end of the shoe presents a smooth surface as at 68 for abutment of the outer end of the large coil spring 10 at 24 as previously set forth.

The wedge block 26 is shown in detail in Figures 13, 14, 15 and 16 wherein it may be observed that it comprises a generally oval-shaped flat body of solid metal having the central bolt opening 70 and presenting a generally smooth outer face upon the lateral edges of which may be seated as at 34, 34 the bases or inner ends of the outer shoes 17, 17. The perimeter of the wedge block conforms generally in shape to the shape of the friction end of the housing in section as most clearly seen in Figure 3. Arranged around the edge of the wedge block on the inner face thereof are the spring positioning means 29, 29, previously mentioned. At the opposite ends of the block and on the inner face thereof are formed the diagonally arranged wedge faces 32, 32 for abutment with the wedge faces 30, 30 of the inner shoes 20, 20. These faces engage surfaces on the wedge block and may be plane faces or as an alternate they may be of the form shown in Figure 16 wherein two planes transversely merge centrally of the wedge face as indicated at 72 in the said figure.

The follower wedge (Figures 10, 11 and 12) is a cup-like structure of generally oval shape having on its outer face the cavity 42 defined by the annular walls 74 forming a convenient receptacle for the threaded nut of the securing bolt 8, said bolt extending through the opening 44 centrally formed in the follower wedge as previously described. At the opposite sides of the follower wedge and on the short diameter thereof are the diagonally arranged wedge faces 38, 38 as best seen in Figure 12 and arranged for abutment against the diagonal wedge faces 36, 36 of the outer shoes 17, 17. The oval shape of the follower wedge conforms generally to the shape of the open end of the housing as will be readily apparent.

It is to be understood that I do not wish to be limited by the exact embodiment of the invention shown which is merely by way of illustration and not limitation as various and other forms of the device will of course be apparent to those skilled in the art without departing from the spirit of the invention or the scope of the claims.

I claim:

1. In a draft gear, a housing, resilient means, a wedge follower, outer and inner pairs of overlapping friction shoes arranged in tandem and seated in alternate formation against said housing, a wedge block interposed between said pairs of shoes and having engagement with the bases of one pair of said shoes in a plane substantially normal to the axis of said gear and having engagement with the other pair of said shoes in two diagonal planes intermediate the ends thereof, said last-mentioned shoes having abutment against certain of said resilient means and said wedge block having abutment against other of said resilient means and positioning means therefor.

2. In a draft gear, a housing, a plurality of resilient means, sets of diametrically opposed shoes operating in series and overlapping longitudinally of said housing, and a wedge block interposed between said sets of shoes, certain of said resilient means having abutment against said wedge block and certain other of said resilient means having abutment against one set of said shoes at the radially inner edges of the bottom surfaces thereof whereby the force from certain of said resilient means passes successively through both sets of shoes and the force from other of said resilient means passes through only one set of said shoes.

3. In a draft gear, a housing, a plurality of spring means, a wedge follower, sets of diametrically opposed friction shoes arranged in tandem therebetween, the shoes of said sets being alternately seated against said housing and overlapping longitudinally thereof, and a wedge block interposed between said sets of shoes, the bases of the shoes of one set having their radially inner edges seated on certain of said spring means and the bases of the shoes of the other set having their radially inner edges seated on said block, and certain of said spring means having abutment against said block.

4. In a draft gear, a housing having friction faces, a plurality of spring means, wedging means comprising a follower and a block, and pairs of diametrically opposed V-shaped friction shoes disposed to engage said faces in alternate arrangement between said follower and block, the shoes of respective pairs overlapping longitudinally of said housing, one pair of said friction shoes having their inner ends seated on said block and the other pair of said shoes having their bases in abutment with certain of spring means, the engagement between said ends and bases and said block and spring means respectively being at the radially inner edges thereof, certain other of said spring means having abutment with said block.

5. In a draft gear, a housing, a resilient means, a wedge follower, sets of diametrically opposed friction shoes arranged in tandem between said means and follower with the shoes of respective sets on axes substantially at right angles to each other and engaging said housing in overlapping relationship longitudinally thereof, and a wedge block interposed between said sets of shoes and having engagement with the bases of one set of shoes in one plane and having diagonal face engagement with the shoes of the other set at points intermediate their ends, the bases of said last-mentioned shoes being seated on certain of said resilient means, the engagement of said bases with said block and resilient means respectively being at the radially inner edges of said bases.

6. In a draft gear, a housing, resilient means, a wedge follower, sets of diametrically opposed friction shoes arranged in tandem between said means and follower and engaging said housing in overlapping relationship longitudinally thereof, the shoes of respective sets being arranged along axes at right angles to each other, and a wedge block interposed between said sets of shoes and having abutment with the bases of one set at the radially inner edges thereof and having diagonal face engagement with the shoes of the other set at surfaces intermediate their ends.

7. In a draft gear, a housing, resilient means, a wedge follower, sets of V-shaped friction shoes arranged in tandem between said means and follower with the shoes of respective sets on axes substantially at right angles to each other, said shoes engaging said housing in alternate arrangement and in overlapping relationship longitudinally thereof, and a wedge block interposed between said sets of shoes, one set of said shoes having the radially inner portions of their bases seated on aid block in one plane and the other set of said shoes having diagonal face engagement with said block, one set of said shoes having abutment with certain of said resilient means.

8. In a draft gear, a housing, resilient means, a wedge follower, sets of friction shoes arranged in tandem between said means and follower, the shoes of respective sets overlapping longitudinally of said housing and being in alternate arrangement thereagainst, said sets being arranged along axes at right angles to each other, and a wedge block interposed between said sets, certain of said shoes having their bases seated on said block and other of said shoes having diagonal face engagement therewith, certain of said resilient means having abutment with one set of said shoes and other of said resilient means having abutment with said block.

9. In a draft gear, a housing, resilient means, wedging means comprising a wedge block and a wedge follower, and inner and outer pairs of diametrically opposed V-shaped friction shoes having engagement with said housing, the shoes of one set being interposed between the shoes of the other set and overlapping longitudinally of said gear, said outer shoes having their bases seated on said block and said inner shoes having their bases seated on certain of said resilient means, certain other of said resilient means having abutment against said block.

10. In a draft gear, a housing, resilient means, a wedge follower, outer and inner sets of diametrically opposed friction shoes arranged in tandem between said means and follower and seated in alternate formation against said housing, said shoes overlapping longitudinally of said housing, said sets being arranged along axes at right angles to each other, a wedge block interposed between said shoes and having engagement with the bases of certain of said shoes in a plane substantially normal to the axis of said gear and having engagement with the other of said shoes in diagonal planes intermediate the ends of said shoes.

11. In a draft gear, a housing having an oval friction end with diametrically opposed V-shaped friction surfaces arranged substantially therearound, resilient means, wedge means comprising a block and a follower, an outer set of friction shoes seated against one set of said surfaces between said follower and block with the bases thereof seated on said block, an inner set of friction shoes seated against said other set of surfaces between said block and said resilient means, the shoes of said sets being arranged along axes substantially at right angles to each other with the shoes of one set interposed between the shoes of the other set and in overlapping relationship longitudinally of said housing.

12. In a draft gear, a housing having an oval friction end with sets of V-shaped friction faces, a plurality of spring means, a wedge follower, sets of diametrically opposed friction shoes arranged in tandem between said follower and said spring means with the shoes of said sets in alternate arrangement against said surfaces and in overlapping relationship longitudinally of said housing, and a wedge block interposed between said sets of shoes with the bases of one set seated thereon in a single plane, one set of said shoes being seated against certain of said spring means and the other set of said shoes being interposed between said follower and block.

13. In a draft gear, a housing having friction faces, a plurality of spring means, wedging means comprising a follower and a block, and pairs of diametrically opposed friction shoes disposed between said spring means and said follower to engage said faces in alternate arrangement and in overlapping relationship longitudinally of said gear, one pair of said friction shoes having their inner ends seated on said block in a single plane and the other pair of said shoes having their bases in abutment with certain of said spring means, said block being interposed between said pairs of shoes.

14. In a draft gear, a housing, resilient means, wedging means comprising a wedge block and a wedge follower, and inner and outer pairs of diametrically opposed V-shaped friction shoes having engagement with said housing between said resilient means and said follower, the shoes of one set being interposed between the shoes of the other set, said sets of shoes being seated along axes substantially at right angles to each other, said outer shoes having their bases seated on said block in a single plane and said inner shoes having their bases seated on certain of said resilient means, said bases having engagement with said block and said resilient means respectively adjacent their radially inner edges.

15. In a draft gear, a housing, resilient means, a wedge follower, sets of diametrically opposed friction shoes arranged in tandem between said resilient means and said follower on axes substantially at right angles to each other and engaging said housing on friction surfaces in overlapping relationship with respect to said sets, and a wedge block interposed between said sets of shoes and having engagement with the bases of one set of shoes in a plane subtantially normal to the axis of said gear.

16. In a draft gear, a housing, resilient means, a wedge follower, sets of diametrically opposed friction shoes in tandem, said sets of shoes engaging said housing in alternate arrangement and in overlapping relationship longitudinally thereof, said sets being arranged along axes at right angles to each other, and a wedge block interposed between said sets of shoes, certain of said shoes having the radially inner areas of their bases seated on said block, and certain other of said shoes having diagonal face engagement therewith.

17. In a draft gear, a housing, resilient means, a wedge follower, outer and inner sets of friction shoes arranged in tandem between said resilient means and said follower and seated in alternate formation against said housing along friction surfaces in overlapping relationship with respect to said sets, a wedge block interposed between said shoes and having engagement with the bases of certain of said shoes in a plane substantially normal to the axis of said gear, said sets of shoes being arranged along axes substantially at right angles to each other.

18. In a draft gear, a housing having pairs of diametrically opposed tapering friction faces adjacent the open end thereof, resilient means, a wedge follower, sets of friction shoes arranged in tandem between said resilient means and said follower and seated against said opposed faces respectively, a wedge block interposed between said sets of shoes, the shoes of said respective sets being arranged along axis substantially at right angles to each other and in overlapping relationship longitudinally of said gear, the bases of the shoes of one set being seated on certain of said resilient means and the bases of the shoes of the other set being seated on said block.

19. In a draft gear of the barrel type, a housing having V-shaped opposed friction faces, resilient means, a wedge follower, sets of diametrically opposed friction shoes arranged in tandem between said resilient means and said follower and seated against said faces, said sets of shoes being arranged along axes substantially at right angles to each other, a wedge block interposed between said sets of shoes and having abutment against the radially inner areas of the bases of one set of shoes in a plane perpendicular to the axis of said gear and abutment against intermediate areas of the other set of shoes, said shoes of the respective sets being in overlapping relationship longitudinally of said gear.

20. In a draft gear of the clutch type, a housing having an oval open end with internal tapering friction surfaces arranged substantially therearound, said surfaces being arranged in sets along the long and short axes of said oval end, a plurality of compression springs, and clutch mechanism comprising a follower, a set of shoes arranged against one set of said surfaces and abutting said follower, a wedge block abutting the inner ends of said set of shoes and having diagonal face engagement with another set of said shoes seated against said other set of said surfaces, said last-mentioned set of shoes having abutment with certain of said compression springs and said wedge block having abutment with other of said compression springs.

21. In a draft gear, a housing having an oval end with internal tapering friction faces arranged in two sets along the long and short axes of said oval end, compression springs, a follower, two sets of friction shoes between said follower and springs in abutment with said sets of faces respectively, and a wedge block interposed between said sets of shoes, said wedge block having abutment against the ends of one set of said shoes in a single plane and against the other set of said shoes along diagonal faces intermediate the ends thereof.

22. In a draft gear, a housing having an oval end with sets of diametrically opposed internal friction surfaces arranged respectively along the long and short diameters thereof, a compression spring, a follower, sets of shoes arranged in series between said follower and spring and seated against said sets of surfaces respectively, and a wedge block interposed between said shoes, said wedge block abutting one set of shoes at the ends thereof in a single plane and abutting the other set of said shoes along diagonal surfaces intermediate the ends thereof.

23. In a series gear of multiple action type wherein pressure from one set of shoes is compounded in an adjacent set of shoes, a housing having an oval end with inner friction surfaces arranged in two sets along the long and short axes of said oval end, compression springs, a follower, two sets of friction shoes between said follower and springs in abutment with said sets of surfaces respectively, and a wedge block interposed between said sets of shoes, said wedge block having abutment against the ends of one set of shoes and against the other set thereof along diagonal faces intermediate the ends thereof, the outer set of said shoes on said short axis having relatively large friction faces in engagement with the friction surfaces of said housing as compared with the shoes of the other set, whereby the pressure per unit area is substantially equalize for all of said shoes against said housing in view of said compounding.

24. In a series gear wherein pressure of one set of shoes is compounded into an adjacent set of shoes, a housing, resilient means, a wedge follower, sets of diametrically opposed friction shoes arranged in tandem between said resilient means and said followers on axes substantially at right angles to each other and engaging said housing on friction surfaces in overlapping relationship with respect to said sets, and a wedge block interposed between said sets of shoes and having engagement with the bases of one set of shoes in a single plane, the outer set of said shoes having friction faces of relatively large area as compared with the friction surfaces of the other set to compensate for and substantially equalize the pressure per unit area developed between all of said shoes and said housing in view of said compounding.

ROBERT B. COTTRELL.

CERTIFICATE OF CORRECTION.

Patent No. 2,207,288.　　　　　　　　　　　　　　　　July 9, 1940.

ROBERT B. COTTRELL.

It is hereby certified that error appears in the printed specification of the above numbered patent requiring correction as follows: Page 3, second column, line 60, for the word "aid" read --said--; page 4, second column, line 20, claim 15, for "subtantially" read --substantially--; line 54, claim 18, for "axis" read --axes--; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.